US010725792B2

(12) United States Patent
Sela et al.

(10) Patent No.: US 10,725,792 B2
(45) Date of Patent: Jul. 28, 2020

(54) NON-VOLATILE STORAGE DEVICE WITH MULTIPLE BOOT PARTITIONS

(71) Applicant: Western Digital Technologies, Inc., Irvine, CA (US)

(72) Inventors: Rotem Sela, Hod Hasharon (IL); Amir Shaharabany, Kochav Yair (IL); Miki Sapir, Nes Ziona (IL)

(73) Assignee: Western Digital Technologies, Inc., San Jose, CA (US)

( * ) Notice: Subject to any disclaimer, the term of this patent is extended or adjusted under 35 U.S.C. 154(b) by 148 days.

(21) Appl. No.: 15/483,035

(22) Filed: Apr. 10, 2017

(65) Prior Publication Data

US 2018/0173536 A1    Jun. 21, 2018

Related U.S. Application Data (60) Provisional application No. 62/434,752, filed on Dec. 15, 2016.

(51) Int. Cl.
| | | |
|---|---|---|
| *G06F 9/00* | (2006.01) | |
| *G06F 15/177* | (2006.01) | |
| *G06F 9/4401* | (2018.01) | |
| *G06F 12/02* | (2006.01) | |

(52) U.S. Cl.
CPC .......... *G06F 9/441* (2013.01); *G06F 12/0246* (2013.01); *G06F 2212/7201* (2013.01)

(58) Field of Classification Search
CPC ..................................................... G06F 9/441
See application file for complete search history.

(56) References Cited

U.S. PATENT DOCUMENTS

| | | | |
|---|---|---|---|
| 6,591,376 B1 | 7/2003 | Van Rooven | |
| 6,862,681 B2 | 3/2005 | Cheston | |
| 7,143,275 B2 * | 11/2006 | Cepulis | G06F 11/1417 |
| | | | 713/1 |
| 9,548,108 B2 * | 1/2017 | Yu | G11C 16/3431 |
| 2004/0193866 A1 * | 9/2004 | Lin | G06F 11/1666 |
| | | | 713/2 |

(Continued)

OTHER PUBLICATIONS

Released Data Sheet, iNAND Extreme, e.MMC 5.0 with HS400 Interface, SanDisk Corporation, Rev. 1.11, Feb. 2015.

(Continued)

*Primary Examiner* — Mohammed H Rehman
(74) *Attorney, Agent, or Firm* — Vierra Magen Marcus LLP (57) ABSTRACT

A memory device is embedded in (or connected to) a host device. The memory device includes a first boot partition and a second boot partition. The first boot partition stores first boot data. The second boot partition stores second boot data. The memory device includes a pointer that points to either the first boot partition or the second boot partition. The memory device transfers the first boot data from the first boot partition in response to receiving a boot signal from the host and the pointer pointing to the first boot partition. The host attempts to boot using the first boot data. If the host does not boot successfully from the first boot data then the host is booted from second boot data transferred from the memory device without the host requesting that the pointer switch to pointing at the second boot data.

9 Claims, 9 Drawing Sheets

(56) References Cited

U.S. PATENT DOCUMENTS

| | | | | |
|---|---|---|---|---|
| 2004/0236936 | A1* | 11/2004 | Bulusu | G06F 8/65 |
| | | | | 713/2 |
| 2010/0064127 | A1* | 3/2010 | Lee | G06F 11/1417 |
| | | | | 713/2 |
| 2010/0125752 | A1* | 5/2010 | Chen | G06F 11/1666 |
| | | | | 714/6.1 |
| 2011/0093741 | A1* | 4/2011 | Liang | G06F 11/1417 |
| | | | | 714/6.1 |
| 2014/0325203 | A1* | 10/2014 | Roche | G06F 11/1417 |
| | | | | 713/2 |
| 2016/0328300 | A1* | 11/2016 | Rahardjo | G06F 11/1417 |
| 2017/0185429 | A1* | 6/2017 | Jeansonne | G06F 21/572 |

OTHER PUBLICATIONS

Jedec Standard JESD84-A44, Embedded MultiMediaCard (e•MMC) e•MMC/Card Product Standard, High Capacity, Including Reliable Write, Boot, Sleep Modes, Dual Data Rate, Multiple Partitions Supports and Security Enhancement, Jedec Solid State Technology Association, Mar. 2009.

* cited by examiner

| Signal | Type | Description |
|---|---|---|
| DATA[0:7] | Input/Output | Bi-directional channel used for data transfer |
| CMD | Input/Output | Command: A bi-directional channel used for device initialization and command transfers |
| CLK | Input | Clock: Each clock cycle directs a 1 bit transfer on the CMD and DATA[0:7] lines |
| RST | Input | Hardware Reset |
| RCLK | Output | Data Strobe |
| VCC | Supply | Four pins used to provide power supply to memory die |
| VCCQ | Supply | Five pins used to provide power supply to memory controller |
| VSS | Supply | Six pins used to provide ground connection to memory die |
| VSSQ | Supply | Five pins used to provide ground connection to memory controller |
| VSF[1:4] | Input/Output | Vendor specific pins |

Figure 9

NON-VOLATILE STORAGE DEVICE WITH MULTIPLE BOOT PARTITIONS

BACKGROUND

Many electronic apparatus make use of embedded memory devices. Often, the embedded memory device includes non-volatile memory such as flash memory. An electronic apparatus that includes an embedded memory device (or is connected to a memory device) is often referred to as a host.

The process of a host starting operation and entering a state of readiness for intended operation is called "booting" or a "boot process." A host typically has a ROM (Read Only Memory) which stores code to start the boot process. When a host is turned on or restarted, it will execute the code stored in the ROM which will instruct the host to read boot data from a dedicated portion of the embedded memory device. The boot data, which can include code as well as reference information (e.g., integers, floating point numbers, characters, words, pointers, etc.), will be used by the host to perform a boot process.

One example of an embedded memory device is an embedded MultiMediaCard ("eMMC"), which implements a MultiMediaCard ("MMC") interface. Some eMMC devices includes two boot partitions. Each boot partition is capable of storing all of the boot data needed to perform a boot process. This way, if one of the boot partitions gets corrupted, the host can use the other boot partition to perform the boot process. The MMC interface provides for the ability of the host to send a command to the eMMC device to switch boot partitions. However, some hosts do not include the code for sending the command to the eMMC device to switch boot partitions within the ROM because the ROM is not big enough to hold the extra code and engineers often want the ROM code to be as simple as possible to reduce the chance of errors. In cases where the code for sending the command to the eMMC device to switch boot partitions is not stored in the ROM, then when a currently being used boot partition gets corrupted the host may not be able to boot.

BRIEF DESCRIPTION OF THE DRAWINGS

Like-numbered elements refer to common components in the different figures.

DETAILED DESCRIPTION

A memory device is embedded in (or otherwise connected to) a host device. The memory device includes a first boot partition and a second boot partition. The first boot partition stores first boot data. The second boot partition stores second boot data. The memory device includes a pointer that points to either the first boot partition or the second boot partition. The memory device transfers the first boot data from the first boot partition in response to receiving a boot signal from the host and the pointer pointing to the first boot partition. The host attempts to boot using the first boot data. If the host does not boot successfully from the first boot data then the host is booted from second boot data transferred from the memory device without the host requesting that the pointer switch to pointing at the second boot data and without the host requesting that the second boot data be transferred from the memory device.

In one embodiment, the memory device transfers the first boot data and the second boot data together in response to the boot signal and the pointer pointing to the first boot partition. If the host does not boot successfully from the first boot data then the host is automatically booted from second boot data without having to switch the pointer or request that the second boot data be transferred, as it automatically uses the second boot data previously transferred with the first boot data.

In one embodiment, the memory device transfers the first boot data from the first boot partition in response to receiving a boot signal from the host and the pointer pointing to the first boot partition. The memory device automatically changes the pointer to point to the second boot partition in response to transferring the first boot data to the host. The host attempts to boot using the first boot data. If the host boots successfully from the first boot data, then the hosts sends a command to the memory device to switch the pointer back to pointing at the first boot partition. If the host does not boot successfully from the first boot data then the host re-sends the boot signal to the memory device and, in response to the host to re-sending the boot signal and the pointer pointing to the second boot partition, the memory device transfers the second boot data from the second boot partition to the host. The host will then boot from the second boot data.

Figure 1:
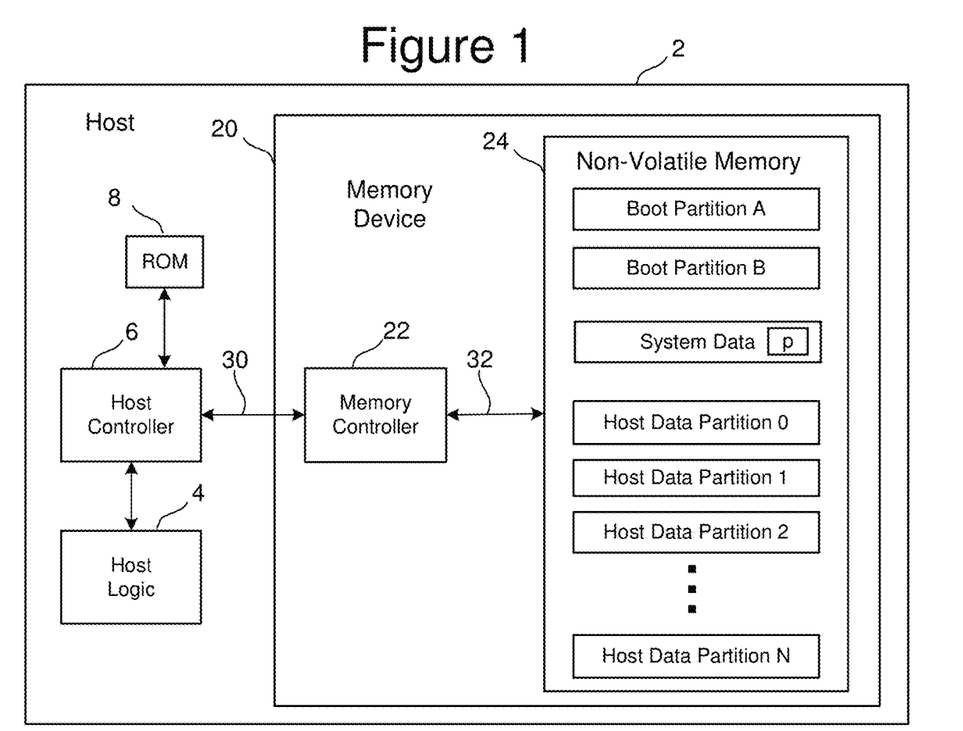
FIG. 1 is a block diagram of a memory device embedded in (and/or connected to) a host device.

FIG. 1 is a block diagram depicting one embodiment of a memory device 20 embedded in a host device 2 that implements the technology described herein. Host device 2 includes host logic 4 for performing the intended functions of host 2. For example, host 2 can be a smartphone, PDA, laptop, set top box or other electronic device. Host logic 4 performs the functions of a smartphone, PDA, laptop, set top box, etc. Host logic 4 is connected to host controller 6 for communicating with memory device 20 via interface 30. In one embodiment, memory device 20 is an eMMC memory device and interface 30 is a MMC interface. Host controller 6 is also in communication with ROM 8.

In one embodiment, ROM 8 stores code to start the boot process for host 2. When host 2 is turned on or restarted (or is otherwise restarting the boot process), host controller 6 accesses code in ROM 8 to start the boot process. That code will instruct host controller 6 to read the boot data from a boot partition in embedded memory device 20.

Memory device 20 includes memory controller 22 in communication with non-volatile memory 24. Note that FIG. 1 shows a logical depiction of non-volatile memory 24. In one embodiment, non-volatile memory 24 can be implemented using one or multiple memory die. Interface 32 between memory control 22 and non-volatile memory 24 maybe any suitable interface including toggle mode 200, 400 or 800. Non-volatile memory 24 includes Boot Partition A, Boot Partition B, System Data, Host Data Partition 0, Host Data Partition 1, Host Data Partition 2, ..., Host Data Partition N. Non-volatile memory device 20 includes two partitions for storing boot data used to boot host 2: Boot Partition A and Boot Partition B. In one embodiment, the two boot partitions can store copies of the same information or store different versions of boot data. The boot data can include code for programming host controller 6 or other portions of host 2, as well as reference information (e.g., fields, integers, floating point numbers, characters, words, etc.). System Data includes various parameters used by memory controller 22 and/or non-volatile memory 24 for operating non-volatile memory 24. Host Data Partition 0, Host Data Partition 1, Host Data Partition 2, ..., Host Data Partition N are portions of the non-volatile memory that store data for the host 2. Among the parameters stored in the System Data is a partition pointer p which points to either Boot Partition A or Boot Partition B. In some embodiments, the partition pointer p is one bit. In other embodiments, the partition pointer p can be multiple bits. Although FIG. 1 shows two boot partitions (Boot Partition A and Boot Partition B), other embodiments can include more than two boot partitions. When there are more than two boot partitions, the partition pointer may have more than one bit to be able to identify a selected boot partition. When host controllers start to boot up, it will be provided with the boot data from the boot partition (Boot Partition A or Boot Partition B) that is pointed to by the partition pointer p.

Figure 2:
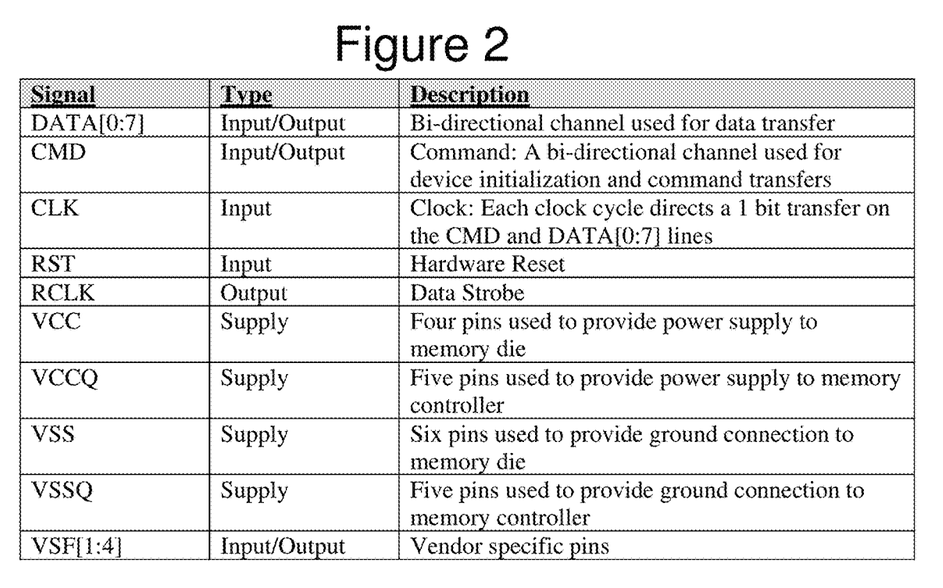
FIG. 2 is a table of input and/or output signals for the memory device.

FIG. 2 is table of input and/or output signals for the memory device 20. The table depicts the following signals DATA[0:7], CMD, CLK, RST, RCLK, VCC, VCCQ, VSS, VSSQ, and VSF[1:4]. These signals implement an MMC interface.

Figure 3:
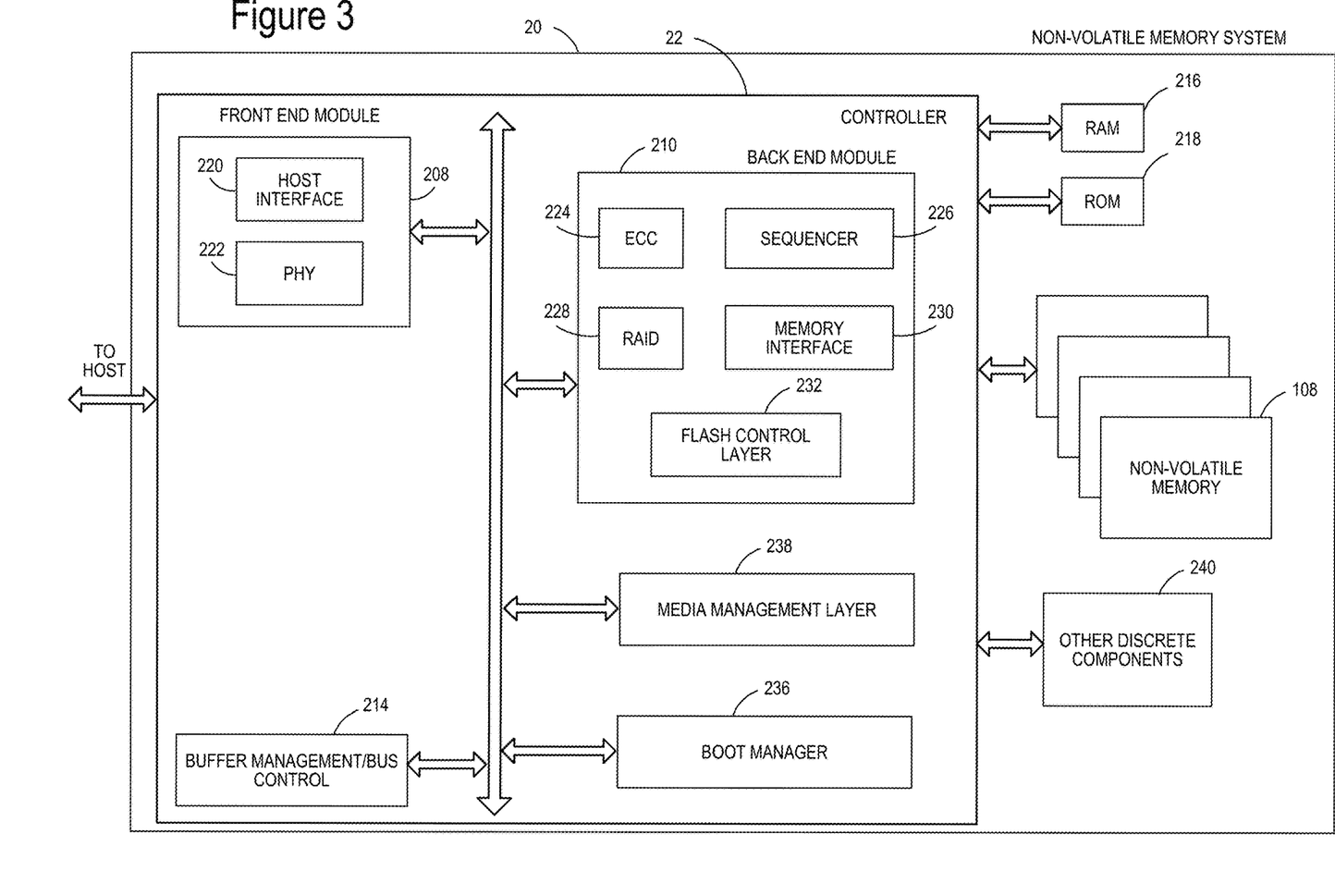
FIG. 3 is a block diagram of one example of a memory device.

FIG. 3 is a block diagram of one example of a memory device 20. However, the architecture depicted in FIG. 3 can also be used to implement other types of non-volatile storage devices. memory device 20 includes a controller 22 connected to one or more non-volatile memory die 108. As used herein, for a system that uses non-volatile memory, a controller is a device that manages data stored on the non-volatile memory and communicates with a host. Controller 22 can have various functionality in addition to the specific functionality described herein. For example, controller 22 can format the non-volatile memory to ensure the memory is operating properly, map out bad memory cells (the physical unit of storage), and allocate spare memory cells to be substituted for future failed cells. Some part of the spare memory cells can be used to hold firmware to operate the controller and implement other features. In operation, when a host needs to read data from or write data to the non-volatile memory, it will communicate with controller 22. If the host provides a logical address to which data is to be read/written, controller 22 converts the logical address received from the host to a physical address in the physical flash memory. Alternatively, the host can provide the physical address. Controller 22 can also perform various memory management functions, such as, but not limited to, wear leveling (distributing write operations among memory die or blocks of the memory die to avoid wearing out specific blocks of memory that would otherwise be repeatedly written to) and garbage collection (after a block is full, moving only the valid pages of data to a new block, so the full block can be erased and reused).

The interface between controller 22 and non-volatile memory die 108 may be any suitable flash interface, such as Toggle Mode 200, 400, or 800. In some embodiments, memory device 20 includes a single channel between controller 22 and non-volatile memory die 108; however, the subject matter described herein is not limited to having a single memory channel For example, in some memory system architectures 2, 4, 8 or more channels may exist between controller 12 and memory die 108, depending on controller capabilities. In any of the embodiments described herein, more than a single channel may exist between controller 22 and memory die 108, even if a single channel is shown in the drawings.

As depicted in FIG. 3, controller 22 includes a front end module 208 that interfaces with a host, a back end module 210 that interfaces with the one or more non-volatile memory die 108, and various other modules that perform functions which will now be described.

The components of controller 22 depicted in FIG. 3 may take the form of a packaged functional hardware unit (e.g., an electrical circuit) designed for use with other components, program code (e.g., software or firmware) executable by a (micro) processor or processing circuitry that usually performs a particular function of related functions, or a self-contained hardware or software component that interfaces with a larger system. For example, each module may include an application specific integrated circuit (ASIC), a Field Programmable Gate Array (FPGA), an electrical circuit, a digital logic circuit, an analog circuit, a combination of discrete circuits, gates, or any other type of hardware or combination thereof. Alternatively or in addition, each module may include software stored in a processor readable device (e.g., memory) to program a processor to perform the functions described herein.

Referring again to modules of the controller 22, a buffer manager/bus control 214 manages random access memory (RAM) 216 and controls the internal bus arbitration of controller 22. A read only memory (ROM) 218 stores boot code for the controller. Although illustrated in FIG. 3 as located separately from the controller 22, in other embodiments one or both of the RAM 216 and ROM 218 may be located within the controller. In yet other embodiments, portions of RAM and ROM may be located both within the controller 22 and outside the controller. Further, in some implementations, controller 22, RAM 216, and ROM 218 may be located on separate semiconductor die.

Front end module 208 includes a host interface 220 and a physical layer interface (PHY) 222 that provide the electrical interface with the host or next level storage controller. The choice of the type of host interface 220 can depend on the type of memory being used. Examples of host interfaces 220 include, but are not limited to, SATA, SATA Express, SAS, Fibre Channel, USB, PCIe, MMC and NVMe. The host interface 220 typically facilitates transfer for data, control signals, and timing signals. In one embodiment, front end module 208 provides the single communication interface adapted to communicate with an external computing device for the controller 22 and memory die 108 of memory device 20.

Back end module 210 includes an error correction code (ECC) engine 224 that encodes the data bytes received from the host, and decodes and error corrects the data bytes read from the non-volatile memory die 108. A command sequencer 226 generates command sequences, such as program and erase command sequences, to be transmitted to non-volatile memory die 108. A RAID (Redundant Array of Independent Dies) module 228 manages generation of RAID parity and recovery of failed data. The RAID parity may be used as an additional level of integrity protection for the data being written into the non-volatile memory system 100. In some cases, the RAID module 228 may be a part of the ECC engine 224. Note that the RAID parity may be added as an extra die or dies as implied by the common name, but it may also be added within the existing die, e.g. as an extra plane, or extra block, or extra WLs within a block. A memory interface 230 provides the command sequences to non-volatile memory die 108 and receives status information from non-volatile memory die 108. In one embodiment, memory interface 230 may be a double data rate (DDR) interface, such as a Toggle Mode 200, 400, or 800 interface. A flash control layer 232 controls the overall operation of back end module 210.

Additional components of memory device 20 illustrated in FIG. 3 include media management layer 238, which performs wear leveling of memory cells of non-volatile memory die 108. System 100 also includes other discrete components 240, such as external electrical interfaces, external RAM, resistors, capacitors, or other components that may interface with controller 22. In alternative embodiments, one or more of the physical layer interface 222, RAID module 228, media management layer 238 and buffer management/bus controller 214 are optional components that are not necessary in the controller 22.

The Flash Translation Layer (FTL) or Media Management Layer (MML) 238 may be integrated as part of the flash management that may handle flash errors and interfacing with the host. In particular, MML is responsible for the internals of non-volatile memory management. In particular, the MML 238 may include an algorithm in the memory device firmware which translates writes from the host into writes to the memory of a memory die 108. The MML 238 may be needed because: 1) the memory may have limited endurance; 2) the memory may only be written in multiples of pages; and/or 3) the memory may not be written unless it is erased as a block. The MML 238 understands these potential limitations of the memory which may not be visible to the host. Accordingly, the MML 238 attempts to translate the writes from host into writes into the flash memory 126. As described below, erratic bits may be identified and recorded using the MML 238. This recording of erratic bits can be used for evaluating the health of blocks and/or word lines (the memory cells on the word lines).

Controller 22 also includes boot manager 236, which can be hardware only (e.g., electrical circuit) or software running on a processor. Boot manager module 236 manages Boot Partition A and Boot Partition B. Boot manager module 236 also manages and/or performs the process for providing boot data from Boot Partition A and Boot Partition B to the host, as well as switching the partition pointer.

Figure 4:
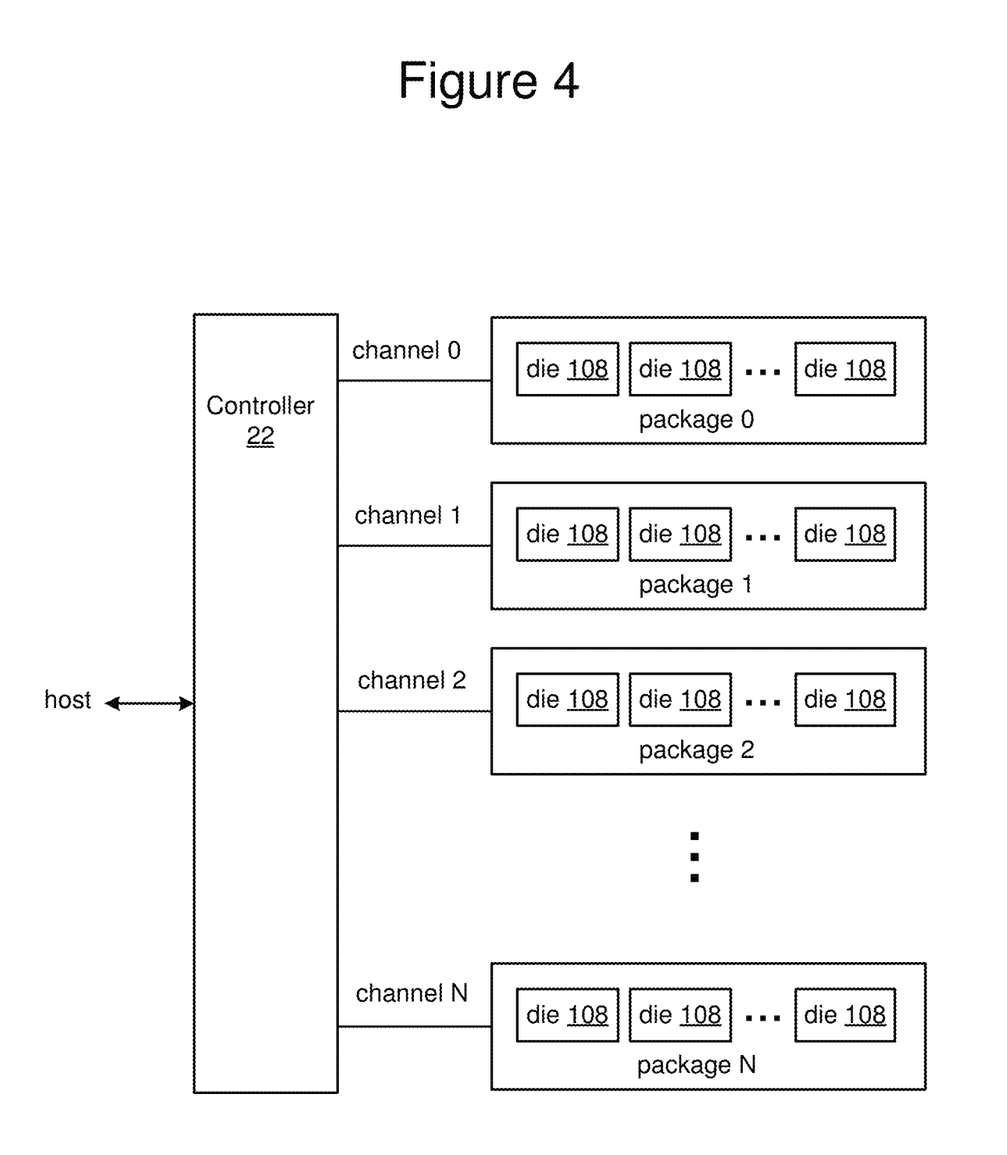
FIG. 4 is a block diagram of one example of a memory device.

Some embodiments of a non-volatile storage system will include one memory die 108 connected to one controller 22. However, other embodiments may include multiple memory die 108 in communication with one or more controllers 122. In one example, depicted in FIG. 4, the multiple memory die can be grouped into a set of memory packages. Each memory package includes one or more memory die 108 in communication with controller 22. FIG. 4 shows N+1 memory packages (package 0–package N), and N+1 channels (channel 0–channel N) for communication between controller 22 and the memory dies 108 of respective memory packages 0–N. In one embodiment, a memory package includes a printed circuit board (or similar structure) with one or more memory die 108 mounted thereon. In some embodiments, a memory package can include molding material to encase the memory dies 108 of the memory package. In one embodiment, a memory package can be a single memory die 108. In some embodiments, controller 22 is physically separate from any of the memory packages.

Figure 5:
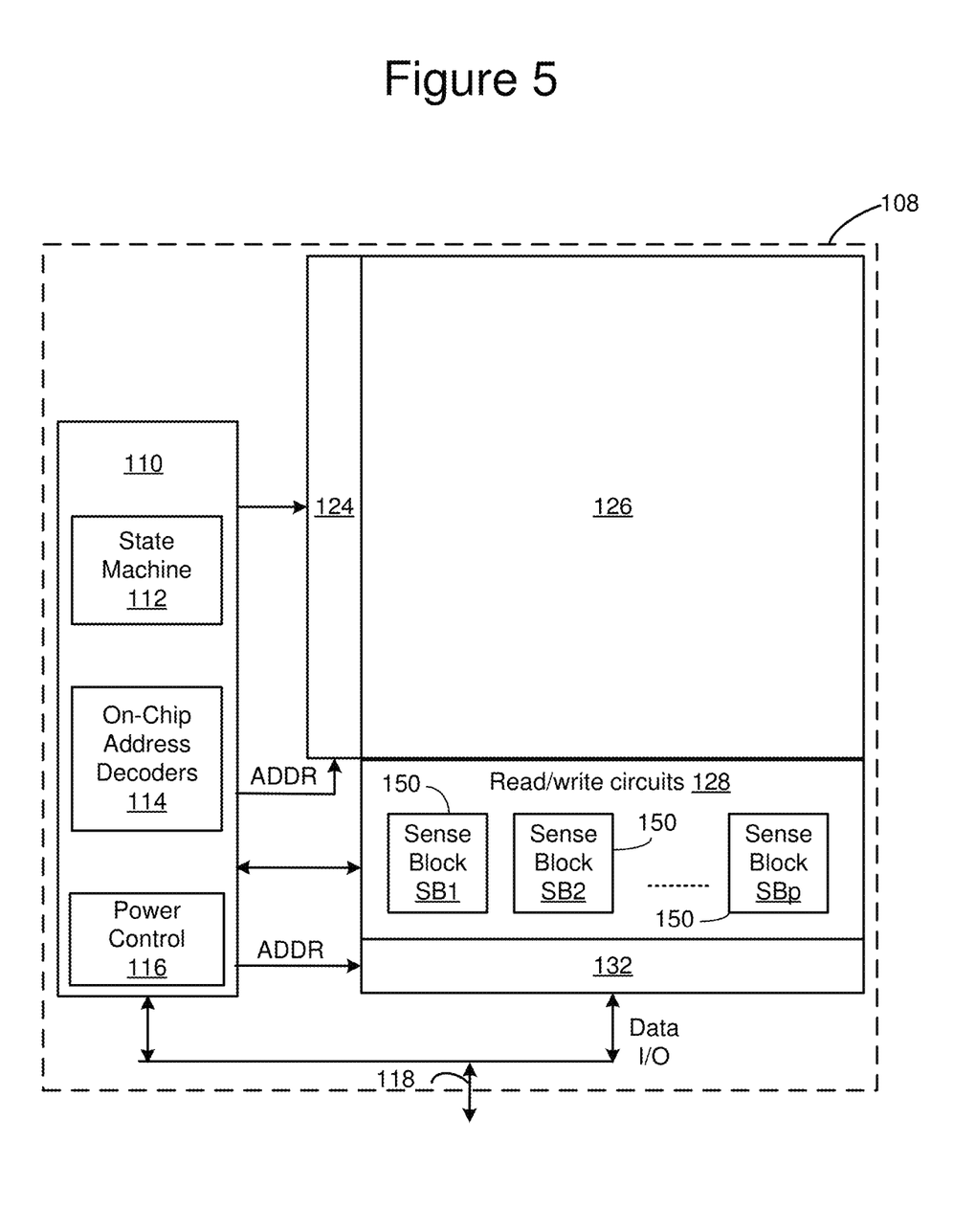
FIG. 5 is a block diagram of a non-volatile memory die.

FIG. 5 is a functional block diagram of an example memory die 108. The components depicted in FIG. 5 are electrical circuits. In one embodiment, memory die 108 includes a monolithic three dimensional memory structure 126 of memory cells (such as, for example, a 3D array of memory cells), control circuitry 110, and read/write circuits 128. In other embodiments, a two dimensional array of memory cells can be used. Memory structure 126 is addressable by word lines via a row decoder 124 and by bit lines via a column decoder 132. The read/write circuits 128 include multiple sense blocks 150 including SB1, SB2, . . . , SBp (sensing circuitry) and allow a page of memory cells to be read or programmed in parallel. Commands and data are transferred between controller 22 and memory die 108 via signal lines 118. In one embodiment, memory die 108 includes a set of input and/or output (I/O) pins that connect to lines 118.

One embodiment of memory structure 126 comprises a monolithic three dimensional memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. In one embodiment, memory structure 126 implements three dimensional NAND flash memory. One example of three dimensional NAND flash memory can be found in U.S. Patent Application 2016/0300619, incorporated herein by reference in its entirety. Other embodiments include two dimensional NAND flash memory, two dimensional NOR flash memory, ReRAM cross-point memories, magnetoresistive memory (e.g., MRAM), phase change memory (e.g., PCRAM), and others.

Control circuitry 110 cooperates with the read/write circuits 128 to perform memory operations (e.g., erase, program, read, and others) on memory structure 126, and includes a state machine 112, an on-chip address decoder 114, and a power control module 116. The state machine 112 provides die-level control of memory operations. In one embodiment, state machine 112 is programmable by the software. In other embodiments, state machine 112 does not use software and is completely implemented in hardware (e.g., electrical circuits). In one embodiment, control circuitry 110 includes registers, ROM fuses and other storage devices for storing default values such as base voltages and other parameters. On-chip address decoder 114 provides an address interface between addresses used by host 140 or controller 22 to the hardware address used by the decoders 124 and 132. Power control module 116 controls the power and voltages supplied to the word lines and bit lines during memory operations. It can include drivers for word lines, selection transistors, source lines, and other components. Power control module 116 may include charge pumps for creating voltages. The sense blocks 150 include bit line drivers.

Any one or any combination of control circuitry 110, state machine 112, decoders 114/124/132, power control module 116, sense blocks 150, read/write circuits 128, and controller 22 can be considered one or more control circuits that performs the functions described herein.

Multiple memory elements in memory structure 126 may be configured so that they are connected in series or so that each element is individually accessible. By way of non-limiting example, flash memory devices in a NAND configuration (NAND flash memory) typically contain memory elements connected in series. A NAND string is an example of a set of series-connected memory cells and select gate transistors that can be used within memory structure 126. A NAND flash memory array may be configured so that the array is composed of multiple NAND strings of which a NAND string is composed of multiple memory cells sharing a single bit line and accessed as a group. Alternatively, memory elements may be configured so that each element is individually accessible, e.g., a NOR memory array. NAND and NOR memory configurations are exemplary, and memory cells may be otherwise configured.

The memory cells may be arranged in the single memory device level in an ordered array, such as in a plurality of rows and/or columns. However, the memory elements may be arrayed in non-regular or non-orthogonal configurations, or in structures not considered arrays.

In one embodiment, a three dimensional memory array is arranged so that memory cells occupy multiple planes or multiple memory device levels, thereby forming a structure in three dimensions (i.e., in the x, y and z directions, where the z direction is substantially perpendicular and the x and y directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory cells. The vertical columns may be arranged in a two dimensional configuration, e.g., in an x-y plane, resulting in a three dimensional arrangement of memory cells, with memory cells on multiple vertically stacked memory planes. Other configurations of memory elements in three dimensions can also constitute a three dimensional memory array.

By way of non-limiting example, in a three dimensional NAND memory array, the memory elements may be coupled together to form vertical NAND strings that traverse across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration.

One example memory system is a three dimensional memory structure that includes vertical NAND strings with charge-trapping material. Other (2D and 3D) memory structures can also be used with the technology described herein. For example, floating gate memories (e.g., NAND-type and NOR-type flash memory), ReRAM cross-point memories, magnetoresistive memory (e.g., MRAM), and phase change memory (e.g., PCRAM) can also be used.

One example of a ReRAM cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. This configuration is known as a spin valve and is the simplest structure for an MRAM bit. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCRAM) exploits the unique behavior of chalcogenide glass. One embodiment uses a GeTe-Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave.

A person of ordinary skill in the art will recognize that the technology described herein is not limited to a single specific memory structure, but covers many relevant memory structures within the spirit and scope of the technology as described herein and as understood by one of ordinary skill in the art.

Looking back at FIG. 1, each of Boot Partition A and Boot Partition B stores all the boot data needed to perform a boot process for host 2. As described above, host 2 will boot from the boot data stored in the boot partition pointed to by partition pointer p. If the data in one of the boot partitions gets corrupted, host 2 can change the partition pointer p to the other boot partition so that the host can boot from the other non-corrupted boot partition. If host 2 finds out that a boot partition gets corrupted during normal operation of the host, the host controller can use a write command to perform a programming operation to switch partition pointer p to point to the non-corrupted boot data. However, if the boot data gets corrupted unbeknownst to host 2, the next time host 2 attempts to boot it will be unsuccessful in booting because the boot data is corrupted. Either, non-volatile memory 24 will not be able to return the boot data because it was unable to decode it and it failed the error correction process or the returned data is not sufficient for host controller 6 to successfully complete the boot process. In order to keep the code in ROM 8 reasonably uncomplicated and short, the code in ROM 8 does not include logic for programming host controller 6 to recover from an unsuccessful boot by changing the partition pointer to point to the uncorrupted boot partition and restart the boot process. Therefore, it is proposed that memory device 20 is configured to transfer data from the second boot partition to the host 2 without receiving a message from the host 2 referencing a switch to the second boot partition. This process is discussed in more detail with respect to FIG. 6.

Figure 6:
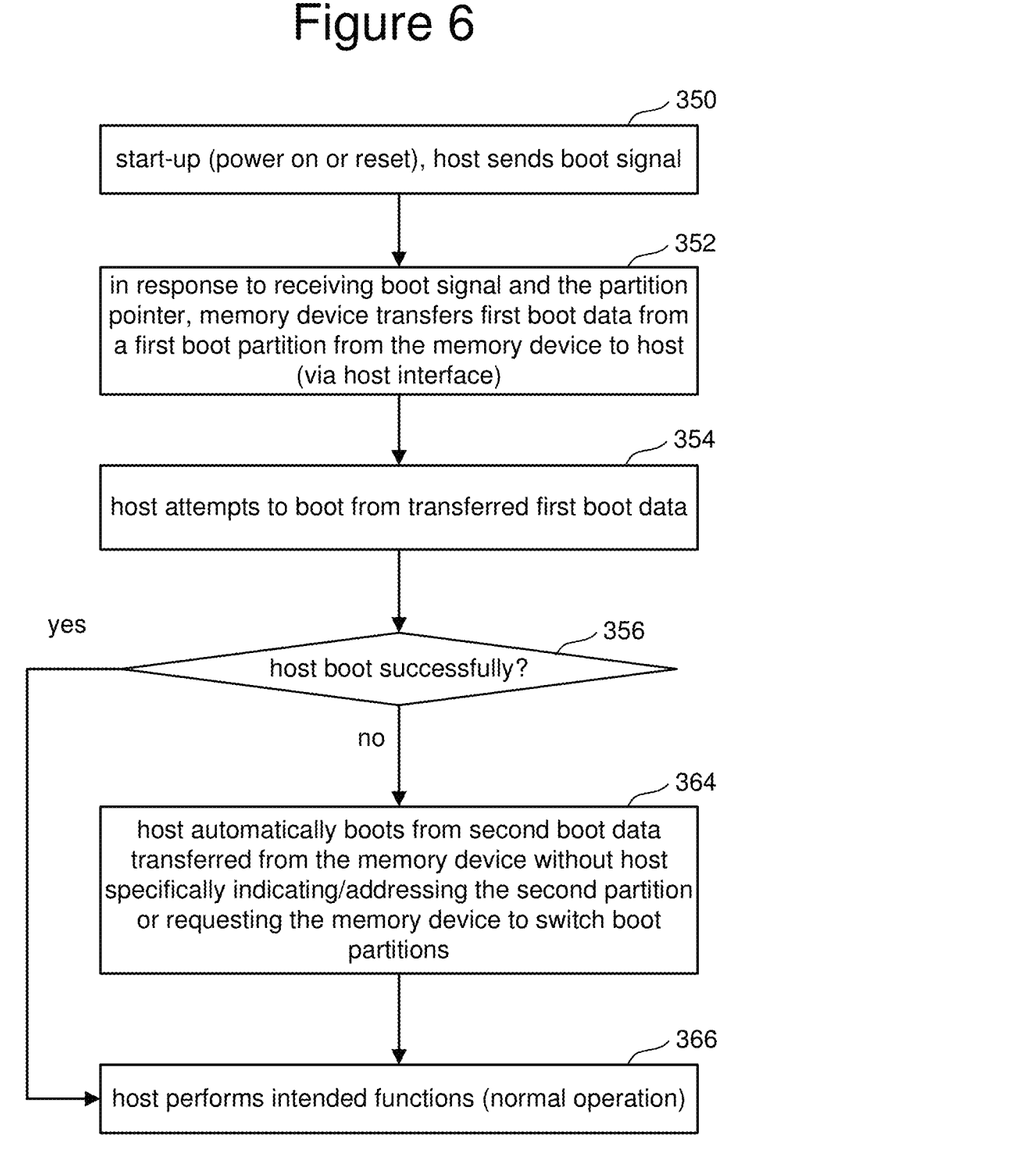
FIG. 6 is a flow chart describing one embodiment of a process for booting a host device.

FIG. 6 is a flow chart describing one embodiment of a process for booting a host device. In step 350, memory device 20 starts up (which can include a power-on or reset).

For example, host 2 can cycle or turn on power to memory device 20. Alternatively, host 2 can do a hardware reset using the RST signal of MMC interface 30 (see FIG. 2). As part of the start-up process, host 2 sends a boot signal to memory device 20. For example, host controller 6 will send a boot signal to memory controller 22 via interface 30. One example of sending a boot signal as per the MMC interface includes host controller 6 lowering the CMD signal (see FIG. 2) for 74 consecutive clock cycles. In response to the boot signal, memory controller 22 reads the partition pointer p in the System Data to see which boot partition is being pointed to. In step 352, in response to receiving the boot signal and in response to the current value of the partition pointer p, memory controller 22 transfers first boot data of a first boot partition from the memory device 20 to the host 2. Step 352 includes memory controller 22 reading the boot data from the boot partition (either Boot Partition A or Boot Partition B) pointed to by the partition pointer. This read process includes reading the data from the non-volatile memory, decoding it (error correction) and sending the decoded data to host controller 6.

In step 354, host 2 attempts to boot from the transferred first boot data. If the host was able to boot successfully, then the host will continue to perform its intended functions (normal operation) in step 366. However, if the host was not able to boot successfully, possibly because the boot data in the pointed to boot partition was corrupted, then host 2 will automatically boot from second boot data (from the second boot partition which was not pointed to by the partition pointer p) that was transferred from the memory device by memory controller 22 without the host specifically indicating/addressing the second boot partition or requesting the memory device switch boot partitions (or switch the partition pointer p). Following a successful booting from the second boot data (step 364), then the host will perform its intended functions (normal operation) in step 366.

Figure 7:
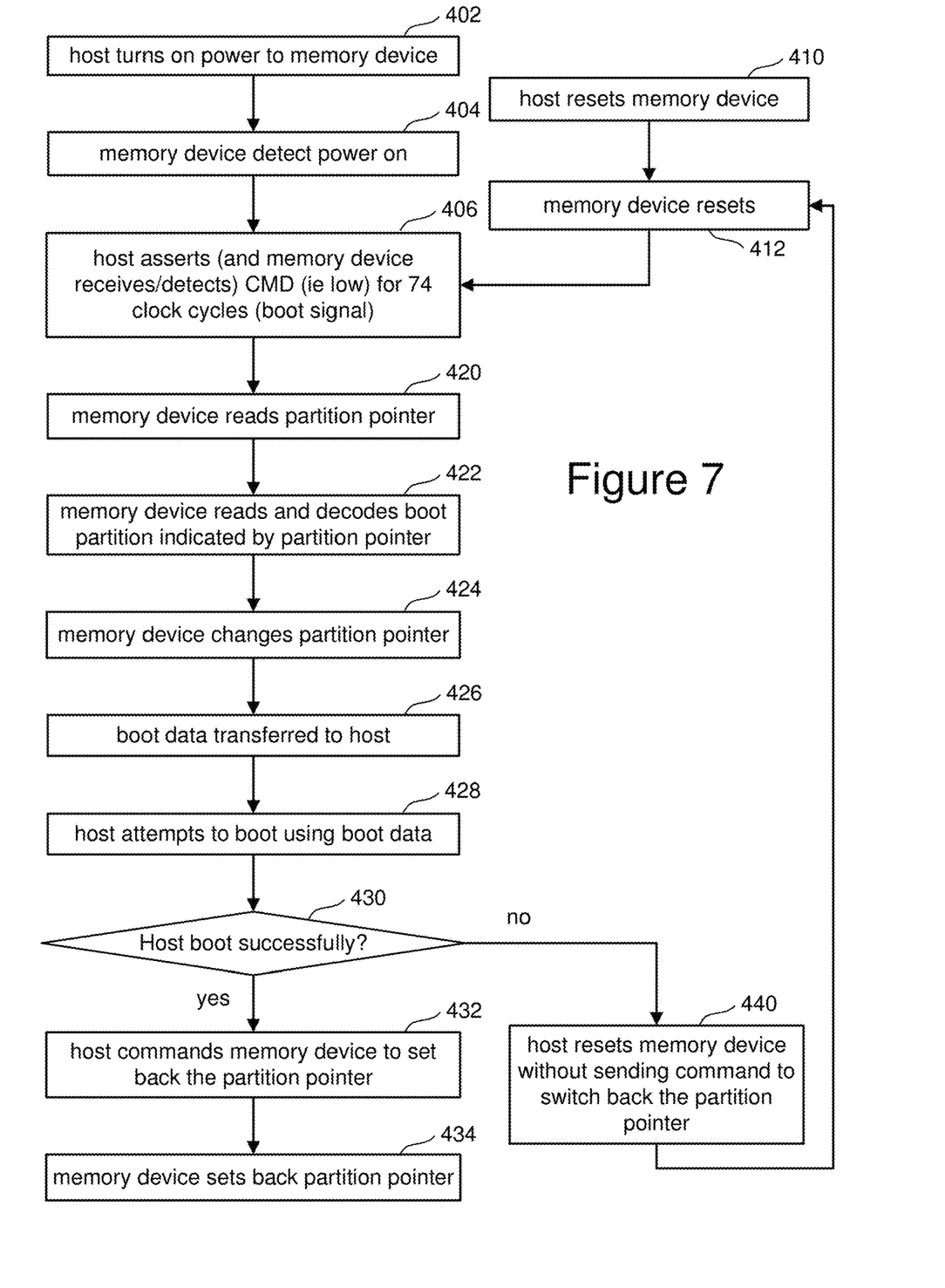
FIG. 7 is a flow chart describing one embodiment of a process for booting a host device.

FIG. 7 is a flow chart describing a more detailed process representing one example implementation of the method for booting depicted in FIG. 6. Thus, the process of FIG. 6 provides more details of steps 350, 352, 354, 356 and 364. In step 402 of FIG. 7, host 2 turns on power to memory device 20 (or cycles power to the memory device) so the memory device starts up. In step 404, memory device 20 detects that power has been turned on. In step 406, the host 2 asserts CMD signal by driving it low for 74 clock cycles (i.e., the boot signal). Alternatively, the host 2 can reset the memory device using the hardware reset RST (see FIG. 2) in step 410. In step 412, memory device 20 detects the reset, and then the process continues in step 406.

In step 420, memory device 20 reads the partition pointer p (in volatile or in non-volatile memory), where the partition pointer is configured to point to either Boot Partition A or Boot Partition B. In step 422, memory device 20 reads and decodes the boot partition indicated by or pointed to by partition pointer p. In step 424, memory device 20 automatically changes the partition pointer to point to the other boot partition. So, if partition pointer p was pointing to Boot Partition A during step 422, then in step 424 memory device 20 will change the partition pointer p to point to Boot Partition B. Step 424 is performed automatically without a command from host 2, meaning that the partition pointer p will be switched by memory device 20 on every reset/power-cycle. Memory device 20 can store the partition pointer p in either RAM (volatile memory) or NAND 108 (non-volatile memory), with each option having its merits. With storing partition pointer p in RAM (volatile memory), in case of full power cycle it will return the same partition which may be corrupted, but in the case of reset the volatile data may be retained and device will retrieve the non-corrupted boot partition (switch partition). The benefit in using volatile memory is that there is no impact on endurance of the non-volatile memory. With storing partition pointer p in NAND 108 (non-volatile memory), in all cases device memory device 20 will switch boot partitions. However, this will impact non-volatile memory endurance with two writes on every boot: one is done by the device, and one by the host (switch back).

In step 426, the boot partition read and decoded in step 422 is transferred to host 2 via the host interface (ie transferring of the initial boot data from the boot partition pointed to by the partition pointer). In step 428, the host 2 attempts to boot using the transferred boot data. If the host booted successfully (step 430), then the host sends a command to memory device 20 to set back the partition pointer p. For example, if the partition pointer p was originally pointing to a first boot partition then in step 424 it was changed to point to a second boot partition, and in step 432 the partition pointer p is changed back to point to the first boot partition. In other words, if when performing steps 402-422, partition pointer p is pointing to Boot Partition A, then in step 424 memory device 20 automatically changes partition pointer p to point to Boot Partition B, and in step 432 host 2 sends a command to memory device 20 to set back the partition pointer p to point to Boot Partition A.

In response to the command from host 2 to set back the partition pointer, memory device 20 sets back the partition pointer p to point to the original boot partition in step 434. Since the partition pointer p is stored in non-volatile memory 24, step 434 includes performing a programing process for the non-volatile memory 24. If, in step 430, it is determined that the host did not boot successfully, then in step 440 the host 2 will reset the memory device 20 (e.g., asserting RST) and send the boot signal (e.g., assert CMD for 74 clock cycles) without sending any command to switch back the partition pointer. After step 440, the process loops back to step 412 and continues as depicted in FIG. 7 so that the host will be sent the boot data from the other (ie second) boot partition in order to perform the boot process. Using the example above, the host would be sent the boot data from the second boot partition.

Figure 7A:
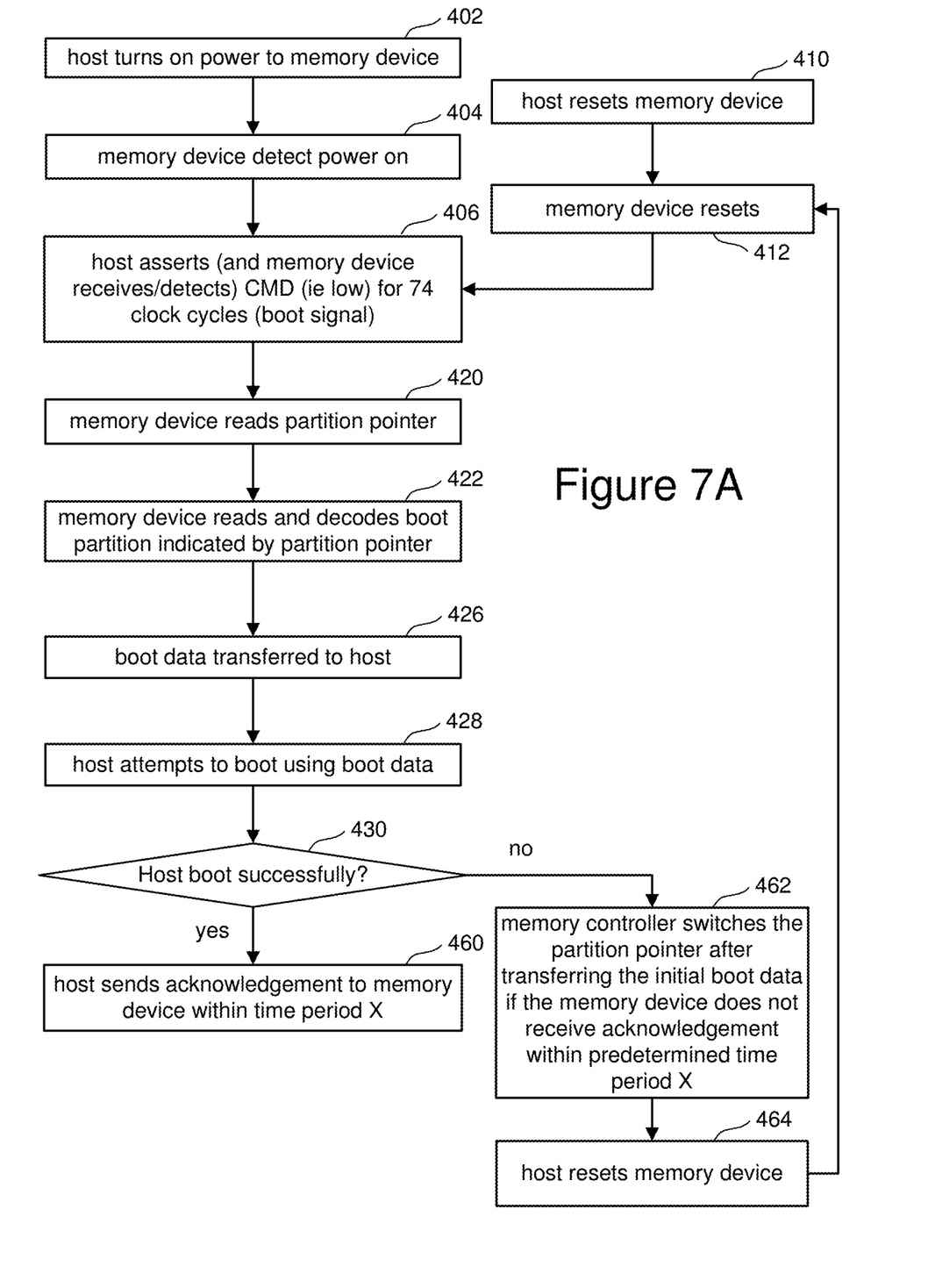
FIG. 7A is a flow chart describing one embodiment of a process for booting a host device.

FIG. 7A is a flow chart describing a process that represents another example implementation of the method of booting depicted in FIG. 6. That is, the process of FIG. 7A is an example implementation of steps 350, 352, 354, 356 and 364. Steps 402, 404, 406, 410, 412, 420, 422, 426, 428 and 430 of FIG. 7A are the same as in FIG. 7. However, in the process of FIG. 7A, there is no step 424 of the memory device automatically changing the partition pointer for every reset/power cycle. Instead, the partition pointer p will be switched by memory device 20 after (1) providing the complete boot data and (2) memory controller 22 didn't receive a, acknowledgement from the host controller 6 within a predetermined time period X, where X could be 0 or an amount of time greater than 0. The assumption is that if the host 2 managed to perform the boot successfully it will send an acknowledgement to the memory controller 22 of memory device 20 within X amount of time. Since the "X" parameter may vary (time by which host sends a command after a successful boot), depending on Host Controller vendor or platform, OEM/Vendor should be able to (one time) configure this parameter. So, in this embodiment, memory device 20 will not update the pointer on every reset/power-cycle and perform two writes for the pointer p on every boot since usually it will send the correct (and uncorrupted) boot partition and host 2 will send the acknowledgement, thereby protecting memory device 20 from wear-out. Thus, after step 430, if host 2 booted successfully, then in step 460 host 2 sends the acknowledgement to memory controller 22 of memory device 20 within time period X. In one embodiment, host 2 sends an explicit acknowledgement to memory controller 22. In another embodiment, rather than sending an explicit acknowledgement host 2 sends an implicit acknowledgement. For example, if host 2 boots successfully then host 2 will send a read or write command to memory controller 22 within time period X. This read or write command serves as the acknowledgement of step 460. If host 2 did not boot successfully (see step 430), then host 2 will not send the acknowledgment, memory device 20 will switch the partition pointer (which is stored in non-volatile memory 24), and the process of FIG. 7A will repeat itself. More specially, in step 462, memory controller 22 of memory device 20 switches the partition pointer after transferring the initial boot data if the memory device does not receive acknowledgement within predetermined time period X. In step 464, the host resets the memory device (after time period X). After step 464, the process loops back to step 412 so that the memory device resets and step 406-426 are performed (again) to transfer subsequent boot data from the new boot partition currently pointed to by the partition pointer in response to receiving the boot data signal from the host (in step 464) subsequent to the switching of the partition pointer (in step 462).

Figure 8:
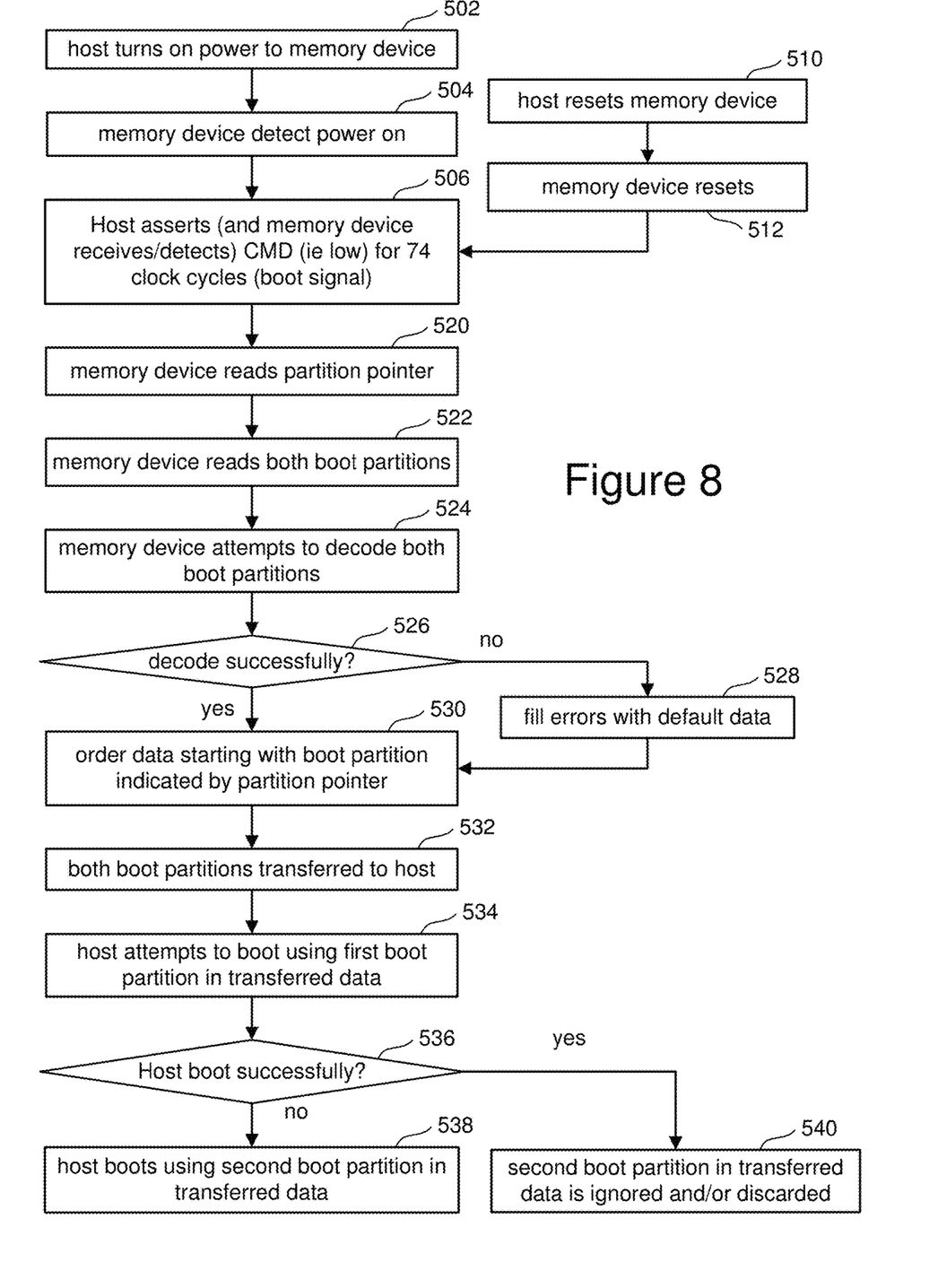
FIG. 8 is a flow chart describing one embodiment of a process for booting a host device.

FIG. 8 is a flow chart describing a process that represents another example implementation of the method of booting depicted in FIG. 6. That is, the process of FIG. 8 is an example implementation of steps 350, 352, 354, 356 and 364. Note that after the processes of FIG. 7, FIG. 7A or FIG. 8, host 2 can perform its intended functions (normal operation—step 362 of FIG. 6).

In step 502 of FIG. 8, host 2 turns on power to memory device 20. In step 504, memory device 20 detects the power is turned on. In step 506, host 2 asserts the CMD signal for 74 clock cycles (the boot signal). Alternatively, the host can reset the memory device in step 510. In step 512, memory device 20 resets. After resetting, the host will assert the CMD signal for 74 clock cycles (boot signal). Other embodiments can use other types of boot signals.

In step 520 of FIG. 8, memory device 20 reads the partition pointer p. In step 522, memory device 20 reads both boot partitions (e.g., Boot Partition A and Boot Partition B). If there are more than two boot partitions, then memory device can read all the boot partitions or a subset of boot partitions (but still reads multiple boot partitions). Step 522 includes memory controller 22 reading from non-volatile memory 24. In step 524, memory controller 22 attempts to decode both boot partitions that were read. It is well known in the art that prior to programming data, the data is converted into code words using an error correction process. Then when the data is read back from the non-volatile memory, a decoding process is used to recover the data and fix any errors in the data. There are many error correction processes that can be used. The technology decried herein is not limited to any one particular error correction process. In step 526, it is determined whether the decoding process for boot partitions was successful. If the decoding process was not successful, memory controller 22 will fill any of the un-decoded code words with information other than successfully decoded data, such as default data. For example, the data can be filled with all zeros. In this way, memory device 20 will not return an "uncorrectable error" code, which indicates that not data will be returned. Instead, data will be returned. The information other than successfully decoded data can also include the decoded data with errors or don't care data. After step 528, the process continues at step 530. Alternatively, if the decoding was successful, then step 528 is skipped and the process will proceed to step 530, which includes ordering the data with the boot partition indicated by the partition pointer p being first and the other boot partition not pointed to by the partition pointer p being second. In step 532, both boot partitions (in the order assembled by step 530) are transferred from the memory device 20 to host 2. In step 534, the host attempts to boot using the first boot partition in the transferred data. If the host 2 did not boot successfully (step 536), then in step 538 the host 2 will boot using the second boot partition that was transferred with the first boot partition in step 532. If the host 2 did boot successfully (step 536), then the second boot partition that was in the transferred data (see step 532) is ignored and/or discarded. In addition to ignore or discard, host 2 may send a stop transition command to memory device 20 and memory device 20 will not transfer the data (if not already completely transferred).

Once the boot process has been successfully completed, host 2 can perform its intended functions (normal operation). As part of the normal operation, in some embodiments, host 2 can perform a standard read operation to read any of the boot partitions. When reading a boot partition using a standard read operation after booting, memory device 20 will perform normal read operations rather than the processes of FIG. 7 or FIG. 8. This concept is explained in more detail with respect to FIG. 9.

Figure 9:
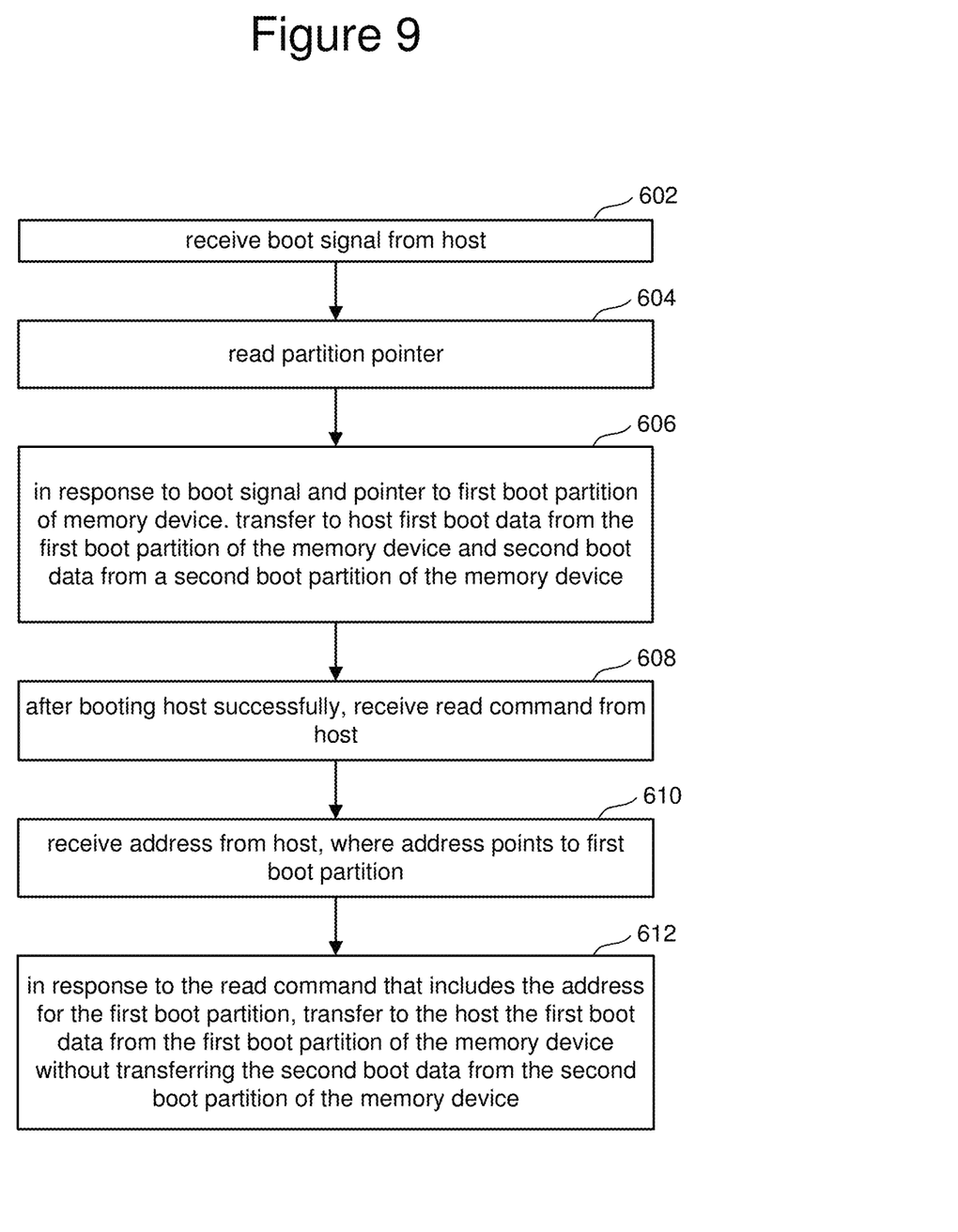
FIG. 9 is a flow chart describing one embodiment of a process for operating a memory device.

FIG. 9 is a flow chart describing one embodiment of a process for operating a memory device. In step 602 of FIG. 9, memory device 20 receives boot signal from the host 2. In step 604, the controller 22 reads the partition pointer p. In step 606, in response to the boot signal and the partition pointer read in step 604 that is pointing to a first boot partition of memory device 20, memory device 20 will then transfer to the host the first boot data from the first boot partition of the memory device. Additionally, memory device 21 will also transfer (at the same time) the second boot data from the second boot partition of the memory device even though the second boot partition was not pointed to by the partition pointer p. In step 608, after the host booted successfully, memory device 20 may receive a read command from the host 2. In step 610, memory device 20 will receive an address from the host. The address is associated with (or part of) the read command of step 608. The address points to a first boot partition of the multiple boot partitions started by memory device 20. In step 612, in response to the read command that includes the address for the first boot partition, memory device 20 will transfer to the host the first boot data from the first boot partition of the memory device without transferring the second boot data from the second boot partition of the memory device. For example, during booting, memory device will send both the data from Boot Partition A and Boot Partition B; however during normal/read read operation memory device 20 will only send either the data from Boot Partition A or the data from Boot Partition B, but not from both.

One embodiment includes as apparatus, comprising a non-volatile memory and a controller connected to the non-volatile memory. The non-volatile memory includes a first boot partition, a second boot partition and one or more host data partitions. The controller includes a host interface. The controller is configured to transfer first boot data from the first boot partition to the host via the host interface in response to receiving a boot signal from the host. The controller is configured to transfer second boot data from the second boot partition to the host via the host interface without receiving a message from the host referencing a switch to the second boot partition.

In one embodiment, the protection of the boot partitions is managed separately and each boot partition has its own separate LBA address space.

One embodiment include a method comprising starting up a memory device; reading a partition pointer in non-volatile memory that is configured to point to or otherwise reference either a first boot partition or a second boot partition; transferring initial boot data from the boot partition references by the partition pointer; switching the partition pointer after transferring the initial boot data if the memory device does not receive a command within a predetermined time period; and transferring subsequent boot data from a boot partition currently referenced by the partition pointer in response to receiving a boot data signal from the host subsequent to the switching the partition pointer.

One embodiment includes a method, comprising: in response to a boot signal and a pointer or reference to a first boot partition of a memory device, transferring to a host first boot data from the first boot partition of the memory device and second boot data from a second boot partition of the memory device; and in response to a read command that includes an address for the first boot partition, transferring to the host the first boot data from the first boot partition of the memory device without transferring the second boot data from the second boot partition of the memory device.

One embodiment includes as apparatus, comprising a host and a memory device connected to the host. The memory device includes a first boot partition and a second boot partition. The memory device includes a pointer configured to point to either the first boot partition or the second boot partition. The memory device is configured to transfer first boot data from the first boot partition to the host in response to receiving a boot signal from the host and in response to the pointer pointing to the first boot partition. The host is configured to attempt to boot using the first boot data. If the host does not boot successfully from the first boot data then the host is booted from second boot data of the second boot partition transferred from the memory device without the host requesting a switch to the second boot data.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A method, comprising:
reading first boot data from a first boot partition of a non-volatile memory device and second boot data from a second boot partition of the non-volatile memory device in response to a boot signal from a host, the first boot partition of the non-volatile memory device and the second boot partition of the non-volatile memory device are physically separate locations of the non-volatile memory device;
attempting to decode the first boot data and the second boot data;
determining an unsuccessful decoding of the first boot data such that one or more code words for the first boot data were not decoded successfully;
replacing at least a portion of the one or more code words for the first boot data that were not decoded successfully with default data in response to the determining the unsuccessful decoding; and
in response to the boot signal, transferring to the host both of the decoded first boot data and the decoded second boot data, the first boot data capable of programming the host to perform a boot process, the second boot data capable of programming the host to perform the boot process, wherein the transferring to the host of the decoded first boot data includes transferring the default data as part of the decoded first boot data.

2. An apparatus, comprising:
a host; and
a memory device connected to the host, the memory device includes a first boot partition and a second boot partition separate from the first boot partition;
wherein:
the host is configured to transmit a boot signal to the memory device;
the memory device is configured to transfer first boot data from the first boot partition and second boot data from the second boot partition to the host in response to receiving the boot signal from the host;
the host is configured to attempt to boot using the first boot data after the first boot data is transferred from the first boot partition to the host and after the second boot data is transferred from the second boot partition to the host; and
the host is configured to boot from the second boot data transferred to the host from the second boot partition if the host does not boot successfully from the first boot data.

3. The apparatus of claim 2, wherein:
the memory device in configured to store a partition pointer that references either the first boot partition or the second boot partition; and the memory device is configured to transfer both of the first boot data and the second boot data in response to the boot signal and the partition pointer pointing to the first boot partition.

4. The apparatus of claim 2, wherein:
the memory device includes a memory controller connected to one or more non-volatile memory dies; and
the memory controller includes a host interface configured to communicate with the host, the memory controller is separate from the host, the first boot data and the second boot data are transferred to the host by the memory controller.

5. A non-volatile storage apparatus configured to be connected to a host, comprising:
non-volatile memory comprising one or more memory dies, the one or more memory dies include a first boot partition and a second boot partition, the second boot partition is at a separate location in the one or more memory dies than the first boot partition; and
a memory controller connected to the non-volatile memory, the memory controller includes a host interface configured to communicate with a host controller on the host, the memory controller is separate from the host and separate from the host controller, the memory controller is configured to transfer first boot data from the first boot partition to the host controller via the host interface in response to receiving a boot signal from the host, the memory controller is configured to transfer second boot data from the second boot partition to the host controller via the host interface without transferring the second boot data from the first boot partition to the host controller and without receiving a message from the host referencing a switch to the second boot partition, the first boot data and the second boot data include code for programming the host controller;
the non-volatile memory is configured to store a partition pointer that references either the first boot partition or the second boot partition;
the memory controller is configured to transfer the first boot data from the first boot partition to the host controller via the host interface in response to receiving the boot signal from the host if the partition pointer is referencing the first boot partition;
the memory controller is configured to transfer the second boot data from the second boot partition to the host controller via the host interface in response to receiving the boot signal from the host if the partition pointer is referencing the second boot partition; and
the memory controller is configured to automatically change the partition pointer after every boot signal.

6. The apparatus of claim 5, wherein:
the memory controller is configured to convert a logical address received from the host to a physical address in the one or more memory dies.

7. A non-volatile storage apparatus configured to be connected to a host, comprising:
non-volatile memory comprising one or more memory dies, the one or more memory dies include a first boot partition and a second boot partition, the second boot partition is at a separate location in the one or more memory dies than the first boot partition; and
a memory controller connected to the non-volatile memory, the memory controller includes a host interface configured to communicate with a host controller on the host, the memory controller is separate from the host and separate from the host controller, the memory controller is configured to transfer first boot data from the first boot partition to the host controller via the host interface in response to receiving a boot signal from the host, the memory controller is configured to transfer second boot data from the second boot partition to the host controller via the host interface without transferring the second boot data from the first boot partition to the host controller and without receiving a message from the host referencing a switch to the second boot partition, the first boot data and the second boot data include code for programming the host controller;
the non-volatile memory is configured to store a partition pointer that references either the first boot partition or the second boot partition;
the memory controller is configured to transfer the first boot data from the first boot partition to the host controller via the host interface in response to receiving the boot signal from the host due to the partition pointer referencing the first boot partition;
the memory controller is configured to automatically change the partition pointer, after receiving the boot signal, to reference the second boot partition regardless of whether the host successfully boots from the first boot data; and
the memory controller is configured to change the partition pointer back to referencing the first boot partition in response to the host successfully booting from the first boot data.

8. The apparatus of claim 7, wherein:
the memory controller is configured to transfer the second boot data from the second boot partition to the host controller via the host interface by decoding data from the second boot partition and sending the data decoded from the second boot partition to the host controller.

9. The apparatus of claim 7, wherein:
the memory controller is configured to transfer the second boot data from the second boot partition to the host controller via the host interface without overwriting the first boot data on the first boot partition with the second boot data.

* * * * *